Patented Apr. 22, 1941

2,238,927

UNITED STATES PATENT OFFICE 2,238,927

DERIVATIVES OF AMINES

Frank J. Cahn and Benjamin R. Harris, Chicago, Ill., assignors to The Emulsol Corporation, Chicago, Ill., a corporation of Illinois No Drawing. Application November 28, 1939, Serial No. 306,584

22 Claims. (Cl. 260—401)

This invention relates to new chemical compounds in the form of derivatives of hydroxy amines, particularly hydroxy aliphatic secondary amines, said chemical compounds being characterized by possessing interface modifying properties rendering said compounds highly useful for the purposes for which such agents are employed in the various arts. The invention also relates to novel intermediate compounds having utility for divers purposes.

From one standpoint, the compounds may be regarded as amides of hydroxy amines with aliphatic carboxylic acids containing not more than five carbon atoms, said compounds also including preferably a higher molecular weight lipophile group, particularly an aliphatic or fatty acid acyl group, and a hydrophilic or polar group, particularly an oxygenated sulphur or an oxygenated phosphorus hydrophilic group.

In general, most of the compounds may be characterized as amides of secondary amines with aliphatic acids containing not more than five carbon atoms, at least one of the two groups which are carbon-linked to the nitrogen of the secondary amine being a hydroxy-alkyl radical the hydrogen of the hydroxyl group of which is replaced by a lipophile radical containing preferably at least eight carbon atoms, and the other of the groups which is carbon-linked to the nitrogen of the secondary amine containing a hydrophilic or polar group or, in other words, a water-solubilizing group.

Many of the novel compounds of the present invention fall within the scope of the general formula:

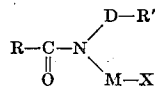

wherein

is an aliphatic acyl radical containing not more than five carbon atoms, D and M are the same or dissimilar organic radicals containing at least two carbon atoms, R' is an organic lipophile radical, and X is a hydrophilic group.

A more limited aspect of the compounds of the present invention may be represented by the general formula

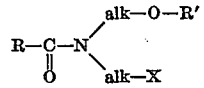

wherein

is an aliphatic acyl radical containing not more than five carbon atoms, alk is a member selected from the group consisting of alkylene, (alkylene-O-alkylene)$_t$ and (alkylene-S-alkylene)$_w$ where $t$ and $w$ are whole numbers, R' is a lipophilic organic radical containing at least eight carbon atoms, and X is a hydrophilic group.

A further and still more limited aspect of the compounds of the present invention, covering especially preferred embodiments, may be represented by the general formula:

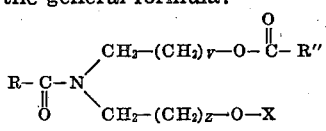

wherein

is a fatty acid acyl radical containing not more than five carbon atoms and preferably only two carbon atoms,

is a fatty acid acyl radical containing at least eight carbon atoms, X is an oxygenated sulphur or phosphorus hydrophilic group, and $v$ and $z$ are whole numbers.

The radical R' in the above formulae may be of aliphatic, cyclo-aliphatic, aromatic or aromatic-aliphatic character and may include substituent groups such as amino, hydroxy, halogen, sulphate, sulphonate, phosphate, carboxyl, nitrile, and the like, as will be pointed out hereinafter but it is particularly preferred that it be unsubstituted aliphatic or fatty and contain at least eight and preferably from twelve to eighteen carbon atoms. D, M, and alk, likewise, may contain substituent groups such as amino, hydroxy, halogen, sulphate, sulphonate, phosphate, carboxyl, nitrile, and the like, and the sequence of carbon atoms therein may be interrupted by O, S, C=O, NH, NR where R is alkyl, and the like. It is especially preferred, however, that each of D, M and alk comprise unsubstituted alkylene radicals containing from two to four carbon atoms.

In order that the nature of the invention may become more apparent, there are listed hereinbelow representative compounds which fall within the scope of the present invention.

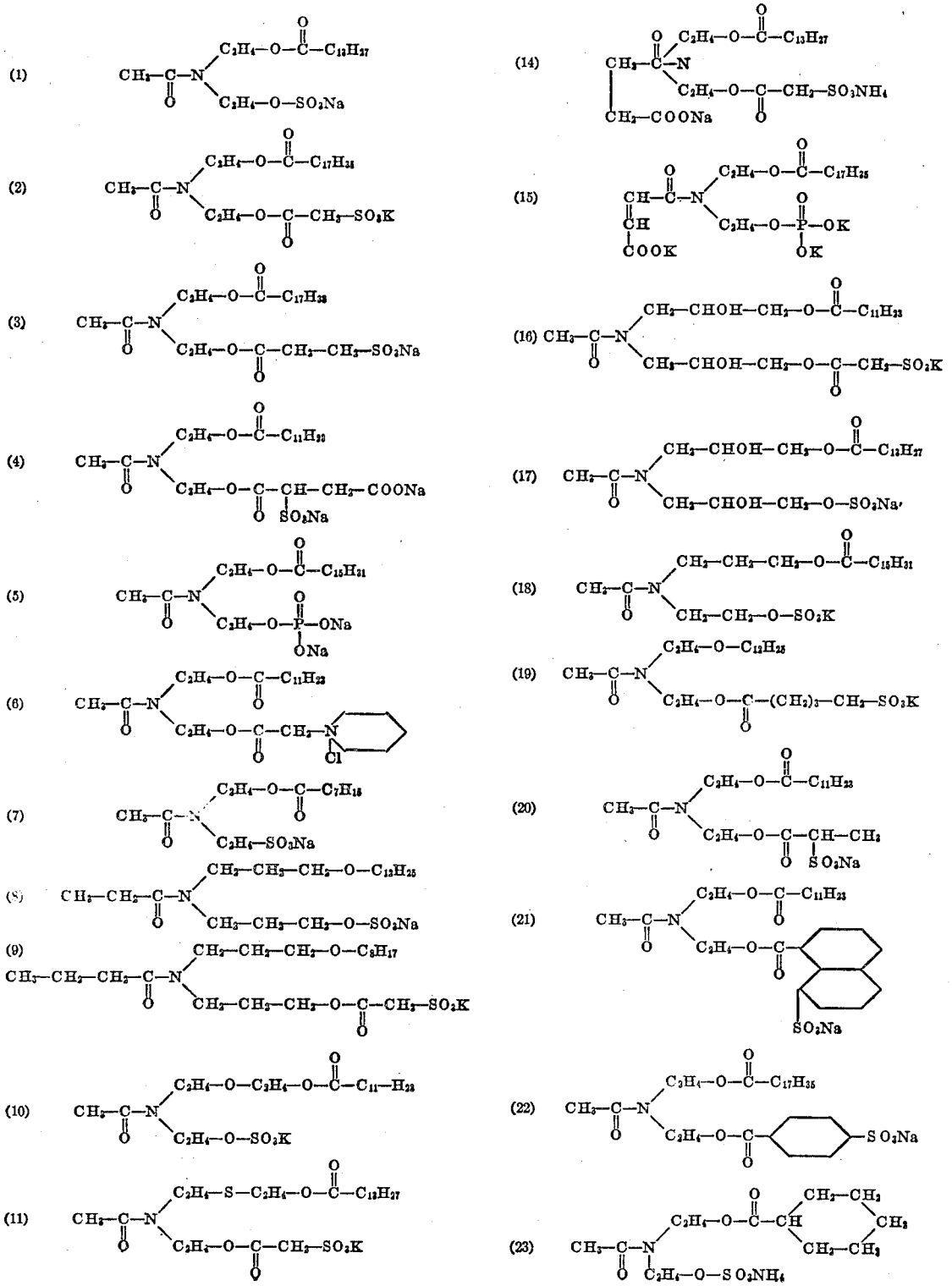

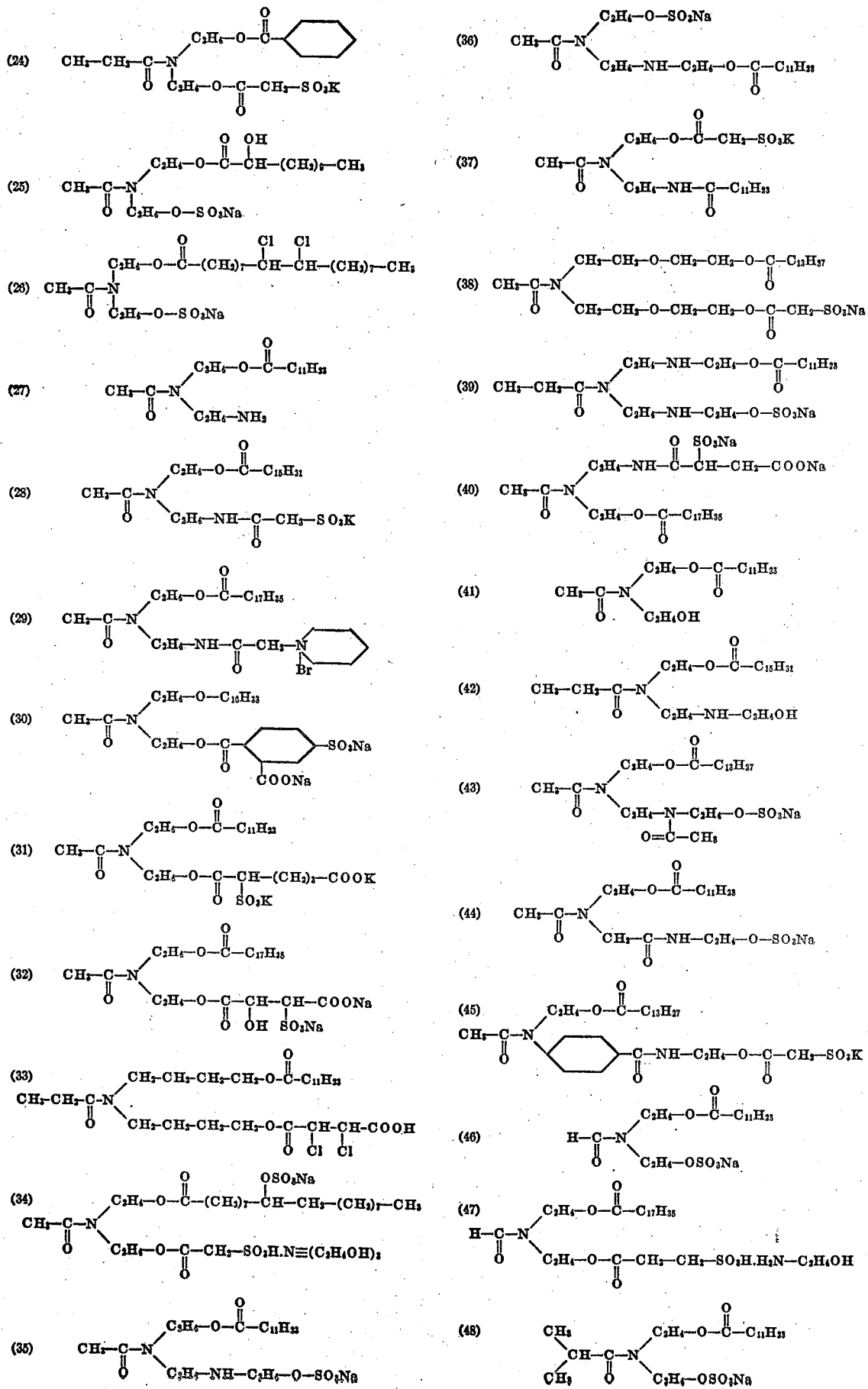

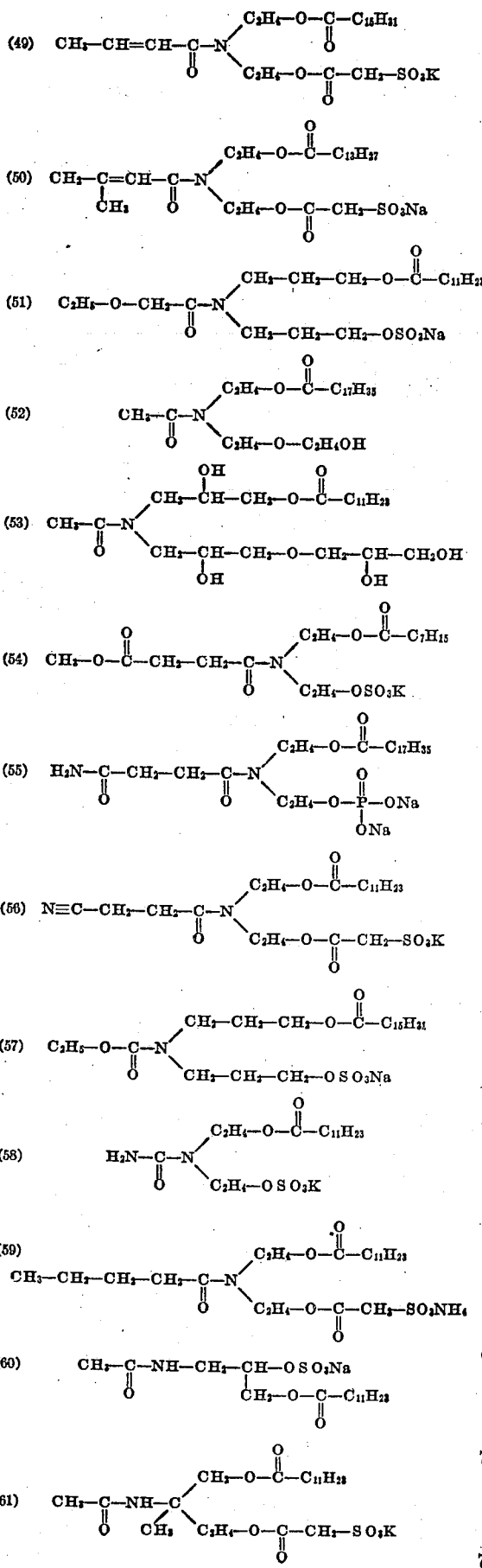
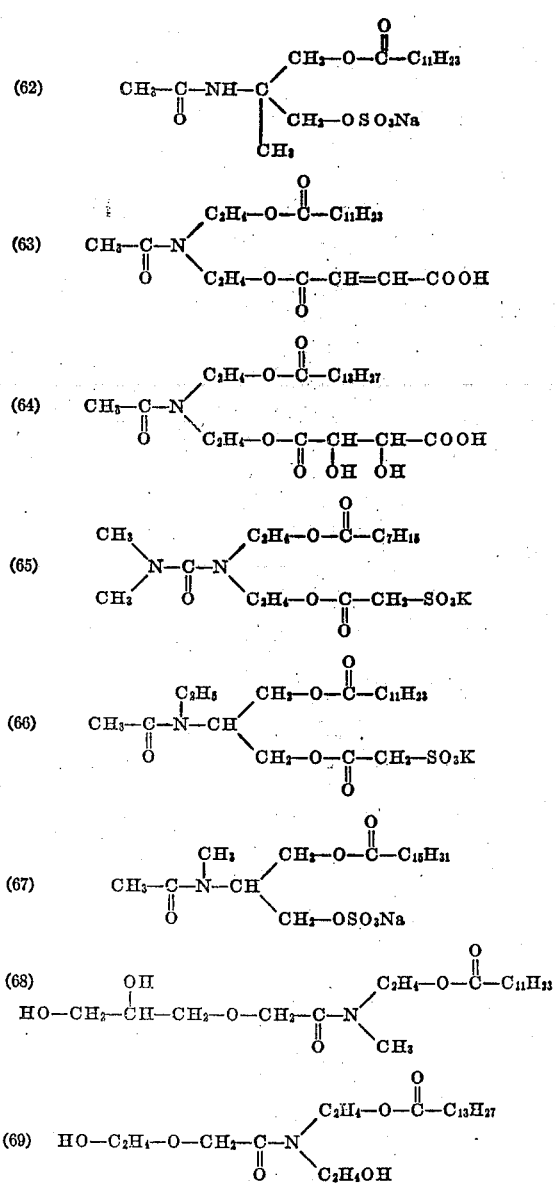

While the above examples represent single substances, it will be understood that in practice it is, in general, advantageous to employ the compounds in the form of reaction mixtures, which reaction mixtures contain preferably substantial proportions of the compounds of the present invention. Furthermore, it will be understood that mixtures of any two or more of the compounds of the present invention may be utilized with or without diluents.
In general, most of the compounds are prepared by initially reacting an hydroxy secondary amine, for example, diethanolamine, with an aliphatic carboxylic acid containing not more than five carbon atoms, or a derivative of such acid such as the halide or ester thereof, for example, acetic acid, acetic anhydride, acetyl chloride, ethyl acetate or methyl acetate, under conditions such as assure a substantial yield of amide. The resulting amide is then reacted with a higher molecular weight organic acid or halide thereof or other lipophile compound in order to introduce a lipophile radical into the molecule and then with a compound which functions to introduce a hydrophilic group into the molecule, as hereinafter more clearly set forth. It will be appreciated that the order of the steps of the process may be varied as, for example, the hydrophilic group may be introduced into the amide of the hydroxy secondary amine and then the lipophilic group may be introduced therein. The following examples are illustrative of methods which have been found suitable for preparing various of the compounds which are disclosed herein.

It will be appreciated that other methods may be utilized and that the proportions of reacting ingredients, times of reaction, order of steps, and temperatures may be varied and that supplementary processes of purification and the like may be resorted to wherever found desirable or convenient. These and other variations and modifications will become evident to those skilled in the art in the light of the guiding principles which are disclosed herein.

*Example A*

(1) 224 grams of methyl acetate (3 mols) and 210 grams of diethanolamine (2 mols) were mixed together, two layers forming at first, the mixture becoming a homogenous mass after a short time. The mixture was refluxed for 19 hours at which time 90% of the diethanolamine had reacted. A portion of the reaction mixture was subjected to a vacuum of 6 millimeters at 60 degrees C. in order to drive off the volatile material, namely, the unreacted methyl acetate and the methyl alcohol which was formed during the reaction. The residue, upon titration, showed a content of 4.64% of free diethanolamine. To 192.5 grams of this residue, 34.7 grams of methyl acetate were added and the mixture was refluxed for 3½ hours. The resulting reaction product was then freed from its low boiling constituents, namely, the methyl alcohol and unreacted methyl acetate, by maintaining the mass at 70 degrees C. under a pressure of 6 millimeters. The residue contained approximately 0.8% of unreacted diethanolamine, based upon a determination of the alkalinity of said residue by titration. The product was a light yellow colored syrup, soluble in water, and contained a compound which was essentially the acetic acid amide of diethanolamine, having the following formula:

$$CH_3-\underset{\underset{O}{\|}}{C}-N\genfrac{}{}{0pt}{}{C_2H_4OH}{C_2H_4OH}$$

(2) 51.0 grams (2 mols) of the acetic acid amide of diethanolamine, produced as described in part (1) hereof, and 38.0 grams (1 mol) of lauric acid were heated together for 15 minutes at approximately 200 degrees C., while passing carbon dioxide gas through the reaction mixture. At the end of the 15 minutes, the free lauric acid had decreased to 1.3%. The product was a yellow colored syrup dispersible in water and having good foaming properties. It could be salted out of its solution by the addition thereto of sodium chloride. The product consisted essentially of a compound having the following formula:

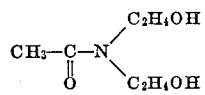

(3) 16.0 grams of the lauric acid ester of the acid amide of diethanolamine, produced in part (2) hereof, were dissolved in 33 cc. of ethylene dichloride and 10 cc. of chlor sulphonic acid were added thereto while maintaining the mass at approximately 0 degrees C. The reaction mass separated into two phases, namely, an ethylene dichloride phase and a wax-like phase. The wax-like phase was then hydrated with ice and neutralized to phenolphthalein with sodium hydroxide. The resulting solution was then heated on a hot water bath to remove the traces of ethylene dichloride. Approximately 160 cc. of a clear solution was obtained which foamed strongly. 10 cc. of this solution dissolved in 500 cc. of tap water at 25 degrees C. wetted a cotton skein in one minute and twenty seconds in the Draves test. The product foamed in acid, neutral and alkali media. The foaming was pronounced even in alkaline and neutral solutions containing calcium ions. The final product contained a substantial proportion of a product having the following formula:

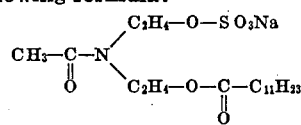

*Example B*

(1) 21.1 grams of the acetic acid amide of diethanolamine and 20 grams of lauric acid were heated at 200 degrees C. for 10 minutes, carbon dioxide gas being passed through the reaction mixture during the reaction in order to remove the water formed as a result of the esterification. The product was a yellow oil, essentially devoid of free fatty acid and freely dispersible in water. It had good foaming properties and by the addition of sodium chloride to the solution it could be salted out. The reaction product contained essentially the monolauric acid ester of the acetic acid amide of diethanolamine.

(2) 23.6 grams of the reaction product produced in part (1) hereof were mixed with 18.0 grams of chlor acetyl chloride. A violent reaction ensued with the evolution of hydrochloric acid, the temperature rising to about 80 degrees C. The reaction product was cooled and added to 200 cc. of cold water. It was then extracted with ethyl ether, the ethyl ether extract washed with water and the ethyl ether evaporated in vacuo. A brownish yellow limpid oily material was obtained, said material consisting essentially of a compound having the following formula:

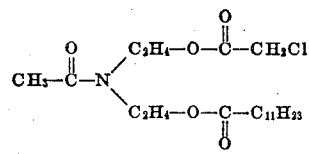

(3) 16 grams of the reaction product produced in part (2) hereof, 20 cc. of water, 26.1 grams of potassium meta-bisulphite ($K_2S_2O_5$), 10.0 grams of potassium hydroxide and 1.0 gram of potassium iodide were heated to nearly boiling for ½ hour. The reaction product was then freed from the inorganic salts by treating it with 300 cc. of boiling isopropyl alcohol. The mass was filtered while hot, the filtrate was evaporated on the water bath, and the residue was extracted with petroleum ether. The residue, which was not soluble in petroleum ether, was freed from adhering petroleum ether by heating on a water bath. Approximately 8.4 grams of a white, wax-like material was obtained. It was soluble in tap water to the extent of at least 18% and formed a clear solution which did not turn cloudy even at 0 degree C. The product foamed strongly, appeared to have excellent properties as a hair shampoo and could be thickened by the addition of an aqueous solution of monoethanolamine sulphate. It was calcium stable and foamed both in acid and alkaline media. The product consisted essentially of a compound having the following formula:

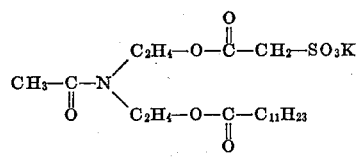

As examples 8, 9, 19 and 30 show, the compounds may also comprise higher molecular weight ether derivatives. The higher molecular weight ethers may be prepared, for example, by reacting a compound containing a reactive halogen—

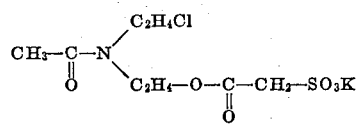

with an alkali metal alcoholate such as sodium laurate or sodium octylate in accordance with general methods known in the art. In general, the higher fatty acid esters are more particularly satisfactory for most purposes and are, therefore, especially preferred.

The organic radical represented by R in the formulae may be derived from various sources. Among such sources may be mentioned acetic acid, ethyl acetate, methyl acetate, acetic anhydride, acetyl chloride, formic acid, lactic acid, propionic acid, butyric acid, hydroxy-butyric acid, furoic acid, ketene, tartaric acid, succinic acid, maleic acid, fumaric acid, crotonic acid, and, in general, aliphatic carboxylic acids, their esters, anhydrides and acyl halides, and substitution derivatives of said acids, which contain not more than five carbon atoms. Of especial utility for most purposes for which the compounds of the present invention find use are acetic acid, its esters and halides.

The organic radical represented by R', in other words the lipophile group, in the various general formulae hereinabove may also be derived from a plurality of sources among which may be mentioned, for example, straight chain and branched chain, saturated and unsaturated, carboxylic, aliphatic (including cycloaliphatic), fatty, aromatic, hydroaromatic, and araliphatic acids including caprylic acid, caproic acid, capric acid, pimelic acid, sebacic acid, behenic acid, arachidic acid, cerotic acid, erucic acid, melissic acid, stearic acid, oleic acid, ricinoleic acid, ricinelaidic acid, ricinostearolic acid, linoleic acid, linolenic acid, lauric acid, myrstic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized and/or polymerized higher fatty acids or higher fatty acids derived from oxidized and/or polymerized triglyceride oils; acyloxy carboxylic acids such as

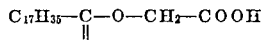

hydroxy and alpha-hydroxy higher carboxylic, aliphatic and fatty acids such as i-hydroxy stearic acid, dihydroxypalmitic acid, dihydroxystearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydro-aromatic acids such as hexa-hydrobenzoic acid, naphthenic acid and abietic acids; araliphatic and aromatic acids such as phthalic acid, benzoic acid, Twitchell fatty acids, naphthoic acid, pyridine carboxylic acid; hydroxy aromatic acids such as salicylic acid, hydroxy benzoic and naphthoic acids, and the like and substitution and addition derivatives of the aforementioned acids, in particular, halogen addition and substitution derivatives. It will be understood that mixtures of any two or more of said acids may be employed if desired and it will also be appreciated that said acids may contain substituent groups such as sulphate, sulphonic, nitrile, thiocyanogen, carbonyl, amide, amine or substituted amine, halogen, ketone and other groups. The acids may be employed as such or in the form of derivatives thereof such as carboxylic acid acyl halides, esters and the like. Of particular utility are the fatty acids or their acyl halides containing at least eight and preferably from twelve to eighteen carbon atoms.

In those cases where higher molecular weight ethers of the amide derivatives of the hydroxy amines are prepared, the higher molecular weight ether radical may be derived from alcoholates prepared from alcohols corresponding to the higher molecular weight acids referred to hereinabove.

The hydroxy amines which are reacted with the acetic acid or the like to produce the intermediate amide include, among others, by way of example, diethanolamine, dipropanolamine, dibutanolamine, dipentanolamine, dihexanolamine, 2-methylamino-propan-diol-1,3; 1-phenylamino-propan-diol-2,3; 1-hydroxyethylamino-2, methoxy-propan-ol-3; 2-N-Methylamino-propan-diol-1,3; monoethanol monopropanolamine, monoethanol monobutanolamine, glycerol mono-amine, diglycerol-amine; hydroxy amines, particularly hydroxy secondary amines derived from polyhydric alcohols, including sugars and sugar alcohols such as dextrose, sucrose, sorbitol, mannitol and dulcitol,

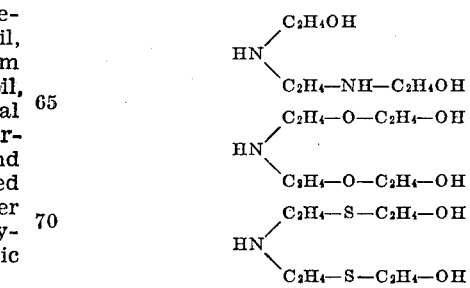

and the like. Those hydroxy secondary amines which contain two hydroxy-alkyl groups are particularly preferred for the preparation of the compounds of the present invention and, because of commercial and other considerations, diethanolamine is especially desirable. It will be understood that the hydroxy amines may be utilized in pure, impure or commercial form.

The hydrophilic groups which are introduced into the compounds of the present invention may be selected from a wide number including sulphates, sulphonates, phosphates, phosphonic acids, pyrophosphates, tetraphosphates, meta phosphates, borates, sulphocarboxylic acids containing not more than eight carbon atoms and preferably from two to four carbon atoms including, among others, sulphoacetate, sulpho-propionate, sulpho-butyrate, sulpho-succinate, sulphomaleate, sulpho-glutarate, sulpho-mucate, sulphoadipate, sulpho-sebacate, sulpho-phthlate, sulpho-aconitic, sulpho-benzoic, and the like. These hydrophillic sulphocarboxylic acids, particularly the sulpho-polycarboxylic acid radicals, may, in certain instances, contain substituent groups such as halogen, amino, cyanogen, hydroxy and the like. Other hydrophilic groups comprise quaternary ammonium radicals and other nitrogenous and non-nitrogenous groups which have a hydrophillic or polar character and which, therefore, tend to enhance the water-solubility or water-dispersibility of chemical compounds into which such radicals are introduced.

Where the compounds or the reaction products containing the same have an acid hydrogen, such compounds may be neutralized in whole or in part with suitable anti-acid materials. In this connection, considerable latitude and modification may be exercised. In general, inorganic as well as organic anti-acid agents may be employed. Examples of such agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, calcium, magnesium, ammonium, and zinc oxides, hydroxides, and salts, potassium stearate, sodium stearate, and the like; organic nitrogenous bases such as primary, secondary and tertiary amines including alcohol-, alkylol-, and aralkylol- amines, including monoethanolamine, diethanolamine, triethanolamine, propanolamines, butanolamines, pentanolamines, hexanolamines, glycerolamines, sugar alkylolamines and sugar alcohol alkylolamines such as those of dextrose, sucrose, sorbitol, mannitol and the like; dimethyl monoethanolamine, diethyl monoethanolamine, dibutyl mono-ethanolamine, diethanol methyl amine, diethanol ethyl amine, diethanol butanol amine, cyclohexyl ethanolamine, diethanol cyclohexylamine, ethanol aniline, alkylol polyamines such as alkylol derivatives of ethylene diamine, mono-methyl mono-ethanolamine, diethyl monoethanolamine, 1-amino-2, 3-propanediol, 1,2-diamino-propanol; alkylamines such as ethylamine, propylamine, laurylamine, cetylamine, butylamine, hexylamine, cyclohexylamine, aniline, toluidines dimethylamine, diethylamine, N-methyl-N-ethyl amine, triethylamine, trimethylamine, ethylene diamine, diethylene triamine, triethylene tetra-amine, betaine, monomethyl ethylene diamine, monoethyl diethylene tetra-amine, mono-allyl amine, hydrazine and substituted hydrazine; aromatic and heterocyclic bases and cyclic nitrogenous substances such as benzylamine, cyclohexylethyl aniline, morpholine, pyridine, dimethylaniline, N-methyl-N-benzyl amine, N-ethyl-N-naphthyl amine, quinoline, quinaldine, piperidine, alkyl pyridines such as methylpyridine, pyrrolidines, nicotine, and homologues and derivatives or substitution products thereof, and, in general, primary, secondary and tertiary amines substituted or not with other radicals, such as hydroxy, alkyl, aryl, cyclo-alkyl groups and the like; quaternary ammonium bases or hydroxides such as tetramethyl ammonium hydroxide, tetra-ethyl ammonium hydroxide, quaternary ammonium bases with dissimilar alkyl radicals such as methyltriethyl ammonium hydroxide, propyl trimethyl ammonium hydroxide; mixtures of any two or more of said bases as, for example, in the case of commercial triethanolamine which contains minor proportions of mono- and di-ethanolamine; proteins and partial digestion or hydrolysis products thereof. It will be understood that these substituted ammonium compounds or organic nitrogenous bases may be utilized in pure, impure, or commercial form.

It will be understood that by the term "cation," as used throughout the specification and claims, is meant hydrogen and such other elements as are mentioned herein, and, in general, atoms or radicals which are regarded as bearing a positive charge or capable of replacing acidic hydrogen. The reaction products may be neutralized to methyl orange, litmus or phenolphthalein or to any desired hydrogen ion concentration. As a general rule, if the salts of the reaction products are employed, it is preferred to use the sodium, potassium, ammonium, alkylolamine, or other soluble salts.

It will be understood that the term "lipophile group," as used herein, includes groups having a definite affinity for oils and fats and comprises, for example, alkyl, aralkyl, aryl, ether or ester groups containing preferably at least eight carbon atoms. The lipophile group possesses predominantly hydrocarbon characteristics and, in general, is derived from triglyceride fats and oils, waxes, mineral oils, other hydrocarbons, and the like.

In contra-distinction thereto, the term "hydrophile group" or "hydrophilic group" or, in other words, the polar or water-solubilizing group, includes groups which possess an affinity for water or aqueous media. In addition to the numerous examples of such groups which have been described hereinabove, those skilled in the art will, in the light of the present teachings, readily be able to select others falling into this category.

The compounds of the present invention have utility in various arts in which interface modifying agents are employed. Many of them are resistant to precipitation by calcium and magnesium salts and are compatible with acid and alkali media. They may, in general, be utilized in washing and laundering and in the textile and related industries wherein they function for wetting, lathering, detergent, emulsifying, penetrating, softening, finishing, dispersing, frothing and foaming purposes. The textiles, various treatments of which in the presence of the agents of the present invention is rendered effective, comprise natural products such as cotton, wool, linen and the like as well as the artificially produced fibres, (and fabrics) such as rayon, cellulose acetates, cellulose ethers and similar artificial silk fabrics and silk and wool substitutes. It will be understood, of course, that the agents may be used in aqueous and other media either alone or in combination with other suitable salts of organic or inorganic character or with other interface modifying agents. In the dyeing of textiles many of them may be employed as assistants in order to bring about even level shades. Many of them also may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of hair washes and hair shampoos, dentifrices of liquid, cream and powder type, cosmetic creams such as cold creams, vanishing creams, tissue creams, shaving creams of the brushless and lathering type and similar cosmetic preparations. Another use to which many of the agents of the invention may be placed is for the treatment of paper or paper pulp or the like. Their capillary or interfacial tension reducing properties enables them to be employed in the fruit and vegetable industry in order to effect the removal from fruits and the like of arsenical and similar sprays. They possess utility in the ore dressing industry wherein they function effectively in froth flotation and aggomeration processes. Their interface modifying properties also permit their use in lubricating oils and the like enabling the production of effective boring oils, cutting oils, drilling oils, wire drawing oils, extreme pressure lubricants and the like. Many of them may also be used with effect in the preparation of metal and furniture polishes, shoe polishes, in rubber compositions, for breaking or demulsifying petroleum emulsions such as those of the water-in-oil type which are encountered in oil-field operations, and with advantage in paints and the like, and for various other purposes which will readily occur to those versed in the art in the light of the disclosure herein.

As detergents, they may in general be dissolved in water or aqueous media and utilized in that form or, in the case of solid products, they may be packaged and sold in such form preferably mixed with diluents. They may also be utilized for commercial cleansing, laundering and washing operations with advantage.

It will be understood that the products of the present invention may be employed for their various purposes either alone or together with lesser or greater quantities of inorganic or organic compounds. Thus, for example, many of them may be employed together with salts such as sodium chloride, alkali metal phosphates including pyrophosphates and tetraphosphates, sodium sulphate, alums, perborates such as sodium perborate, and the like. Many of said products may be utilized in alkaline or acid media in the presence of sodium carbonate, sodium bicarbonate, dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates as, for example, lauryl sodium sulphate, myristyl sodium pyrophosphate, cetyl sodium tetraphosphate, octyl sodium sulphate, oleyl sodium sulphate, and the like; higher molecular weight sulphonic acid derivatives such as cetyl sodium sulphonate and lauryl sodium sulphonate; sulphocarboxylic acid esters of higher molecular weight alcohols such as lauryl sodium sulphoacetate, dioctyl sodium sulphosuccinate, dilauryl potassium sulpho-glutarate, lauryl monoethanolamine sulpho-acetate, and the like; sulphuric and sulphonic derivatives of condensation products of alkylolamines and higher fatty acids; reaction products of phosphoric, pyrophosphoric, metaphosphoric, tetraphosphoric, and polyphosphoric acids with higher molecular weight alcohols; Turkey-red oils; compounds of the type of isopropyl naphthalene sodium sulphonate, and other classes of wetting agents.

As indicated hereinabove, the present invention relates also to certain of the intermediate compounds such as shown, for instance, in Example 41 hereinabove. There appears to be a particular coaction between the acetamide or similar amide group and the hydroxyl-containing group or groups the result of which is to impart unique properties to said intermediate compounds. Many of said intermediates possess excellent detergent, foaming, emulsifying, dispersing, wetting and similar surface modifying characteristics rendering the same useful for preparing oleaginous-aqueous emulsions, for dispersing pulverulent materials, as textile assistants, and the like. Under ordinary circumstances, said intermediates can function as non-ionic interface modifiers. Additional examples of such intermediates are, by way of illustration, the acetic acid amide of the mono-oleic acid ester of diethanolamine; the acetic acid amide of mono-lauryl ether of diethanolamine; the glyceric acid amide of the mono-lauric acid ester of diethanolamine; the lactic acid amide of the mono-lauric acid ester of diethanolamine; the butyric acid amide of the mono-myristic acid ester of dipropanolamine; the citric acid amide of the mono-lauric acid ester of diethanolamine; and similar amide derivatives of higher molecular weight carboxylic esters of secondary hydroxy amines or the like. It will be understood that such compounds may be prepared, in general, by the methods described hereinabove, varying the reactants, proportions, temperatures and the like, all as is appreciated and understood by those versed in the art.

In the preparation of the compounds of the present invention, the various higher fatty acids or the like, hydroxy amines, carboxylic acids containing not more than five carbon atoms, and sources of hydrophilic groups may be utilized in numerous combinations and permutations to make large numbers of compounds not specifically mentioned but which are, nevertheless, within the scope of the invention as pointed out more particularly in the claims.

What we claim as new and desire to protect by Letters Patent of the United States is:

1. Amides of aliphatic hydroxy secondary amines corresponding to the general formula

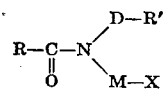

wherein

is an aliphatic acyl radical containing not more than five carbon atoms, D and M are the same or dissimilar organic radicals, R' is an organic lipophilic radical containing at least eight carbon atoms, and X is a hydrophilic group.

2. Amides of aliphatic hydroxy secondary amines corresponding to the general formula

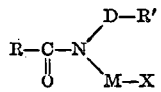

wherein

is an aliphatic acyl radical containing not more than five carbon atoms, D and M are the same or dissimilar organic radicals containing at least two carbon atoms, R' is a member selected from the group consisting of aliphatic alkyl and acyl radicals containing at least eight carbon atoms, and X is a hydrophilic oxygenated sulphur radical.

3. Amides of secondary amines with aliphatic acids containing not more than five carbon atoms, said secondary amines containing two hydroxy-alkyl radicals, the hydrogen of the hydroxyl group of one of said hydroxy-alkyl radicals being replaced by a lipophile radical containing at least eight carbon atoms, and the hydrogen of the hydroxyl group of the other of said hydroxy-alkyl radicals being replaced by a hydrophilic group.

4. Amides of secondary aliphatic amines with aliphatic acids containing not more than five carbon atoms, at least one of the two groups which are carbon-linked to the nitrogen of the secondary amine being an hydroxy-alkyl radical the hydrogen of the hydroxyl group of which is replaced by a lipophile radical containing at least eight carbon atoms, the other of the groups which is carbon-linked to the nitrogen of the secondary amine containing a hydrophilic group.

5. Chemical compounds corresponding to the general formula

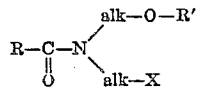

wherein

is an aliphatic acyl radical containing not more than five carbon atoms, alk is a member selected from the group consisting of alkylene, (alkylene-O-alkylene)$_t$ and (alkylene-S-alkylene)$_w$ where $t$ and $w$ are whole numbers, R' is a lipophilic organic radical containing at least eight carbon atoms, and X is a hydrophilic group.

6. Chemical compounds corresponding to the general formula

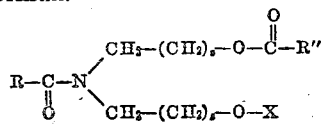

wherein

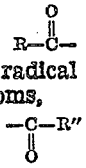

is a fatty acid acyl radical containing not more than five carbon atoms,

is a fatty acid acyl radical containing at least eight carbon atoms, X is a member selected from the group consisting of oxygenated sulphur and phosphorus hydrophilic groups, and $v$ and $z$ are whole numbers.

7. Chemical compounds corresponding to the general formula

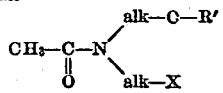

wherein alk is a member selected from the group consisting of alkylene, (alkylene-O-alkylene)$_t$ and (alkylene-S-alkylene)$_w$ where $t$ and $w$ are whole numbers, R' is a lipophilic aliphatic radical containing at least eight carbon atoms, and X is a hydrophilic group.

8. Chemical compounds corresponding to the general formula

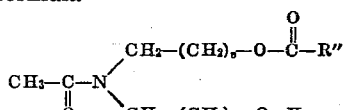

wherein

is a fatty acid acyl radical containing from eight to eighteen carbon atoms, X is a member selected from the group consisting of oxygenated sulphur and phosphorus hydrophilic groups, and $v$ and $z$ are whole numbers.

9. Chemical compounds corresponding to the general formula

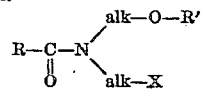

wherein

is an aliphatic acyl radical containing not more than five carbon atoms, alk is a member selected from the group consisting of alkylene, (alkylene-O-alkylene)$_t$ and (alkylene-S-alkylene)$_w$ where $t$ and $w$ are whole numbers, R' is an alkyl radical containing at least eight carbon atoms, and X is a hydrophilic group.

10. Chemical compounds corresponding to the general formula

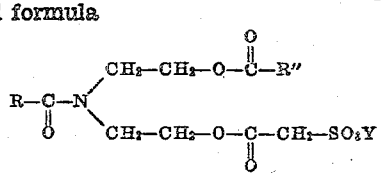

wherein

is a fatty acid acyl radical containing not more than five carbon atoms.

is a fatty acid acyl radical containing at least eight carbon atoms, and Y is a cation.

11. Chemical compounds corresponding to the general formula

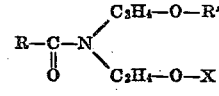

wherein

is an aliphatic acyl radical containing not more than five carbon atoms, R' is a member selected from the group consisting of aliphatic acyl and alkyl radicals containing at least eight carbon atoms, and X is a hydrophilic group.

12. Chemical compounds corresponding to the general formula

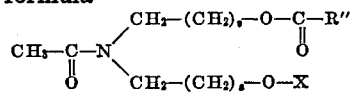

wherein

is a fatty acid acyl radical containing at least eight carbon atoms, X is a hydrophilic sulphocarboxylic acid radical, and $v$ and $z$ are whole numbers.

13. Chemical compounds corresponding to the general formula

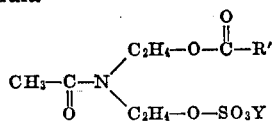

wherein

is a fatty acid acyl radical containing from eight to eighteen carbon atoms, and Y is a cation.

14. Chemical compounds corresponding to the general formula

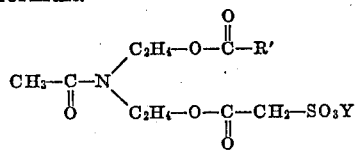

wherein

is a fatty acid acyl radical containing from eight to eighteen carbon atoms, and Y is a cation.

15. Chemical compounds corresponding to the general formula

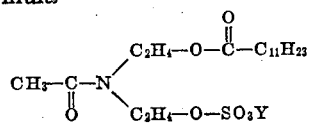

wherein Y is a cation selected from the group consisting of the alkali metals, ammonium, and substituted ammonium cations.

16. Chemical compounds corresponding to the general formula

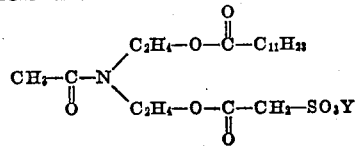

wherein Y is a cation selected from the group consisting of the alkali metals, ammonium, and substituted ammonium cations.

17. Amides of secondary polyamines with aliphatic acids containing not more than five carbon atoms, said secondary polyamines containing at least two hydroxy-alkyl radicals, the hydrogen of the hydroxyl group of one of said hydroxy-alkyl radicals being replaced by a lipophile radical containing at least eight carbon atoms, and the hydrogen of the hydroxyl group of another of said hydroxy-alkyl radicals being replaced by a hydrophilic group.

18. Amides of secondary aliphatic polyamines with aliphatic acids containing not more than five carbon atoms, at least one of two of the groups which are carbon-linked to the nitrogen of the secondary polyamine being an hydroxyalkyl radical the hydrogen of the hydroxyl group of which is replaced by a lipophile radical containing at least eight carbon atoms, the other of the groups which is carbon-linked to the nitrogen of the secondary amine containing a hydrophilic group.

19. An amide of an hydroxy-amine with an aliphatic carboxylic acid containing not more than five carbon atoms, said hydroxy-amine containing at least two hydroxy groups, the hydrogen of one of said hydroxy groups being replaced by a lipophile radical containing at least eight carbon atoms, and the hydrogen of said other hydroxy group being replaced by a hydrophilic group.

20. An amide of an hydroxy-amine with an aliphatic carboxylic acid containing not more than five carbon atoms, said hydroxy-amine containing at least two hydroxy groups, the hydrogen of one of said hydroxy groups being replaced by an aliphatic carboxylic acyl radical containing at least eight carbon atoms, and the hydrogen of said other hydroxy group being replaced by an oxygenated sulphur hydrophilic group.

21. A chemical compound in the form of an amide of an hydroxy-amine with an aliphatic carboxylic acid containing not more than five carbon atoms, said chemical compound also including a higher molecular weight carboxylic acyl radical having at least eight carbon atoms and a member selected from the group consisting of oxygenated sulphur and oxygenated phosphorus hydrophilic group.

22. A chemical compound in the form of an acetic acid amide of an aliphatic hydroxy-amine, said chemical compound also including a higher molecular weight fatty acid acyl radical having from eight to eighteen carbon atoms and an oxygenated sulphur hydrophillic group, said higher molecular weight fatty acid acyl radical and said hydrophilic group being linked to different atoms of said aliphatic hydroxy-amine.

FRANK J. CAHN.
BENJAMIN R. HARRIS.